March 7, 1950     J. D. SURMATIS     2,499,796

POLYSTYRENE RESIN AND POLYMERIZATION PROCESS

Filed Jan. 8, 1945

Inventor

Joseph D. Surmatis

Patented Mar. 7, 1950

2,499,796

UNITED STATES PATENT OFFICE 2,499,796

POLYSTYRENE RESIN AND POLYMERIZATION PROCESS

Joseph D. Surmatis, Boston, Mass., assignor, by mesne assignments, to Chemical Development Corporation, Boston, Mass., a corporation of Massachusetts Application January 8, 1945, Serial No. 571,837

4 Claims. (Cl. 260—93.5)

This invention consists of a new light-colored polymeric thermoplastic resin which is obtained from styrene. The invention includes within its scope an improved polymerization process by which this resin may be produced and which is characterized by the employment of sulfuric acid or aromatic sulfonic acids or phosphoric acid as catalyst.

It has been known for some time that styrene may be polymerized by the aid of heat or light, or preferably by the aid of a catalyst as, for example, a peroxide, ozonide, or a metal halide to give a resinous polymer. Attempts have been made to use sulfuric acid as a catalyst for the polymerization of styrene, but these attempts have not been successful because it was found that sulfuric acid blackened the resulting resin.

My new method of polymerization is the more surprising since I have observed that when an attempt is made to use a mixture of 5 parts concentrated sulfuric acid and 5 parts of glacial acetic acid as catalyst mixture with 100 parts of syrupy styrene, the resulting reaction takes place with decomposing violence.

I have now discovered that styrene may be simply and rapidly polymerized by means of sulfuric acid as catalyst in the presence of a restrainer such as glacial acetic acid, or one of the aliphatic alcohols, to give a resin with physical and chemical characteristics strikingly different from any of the previously known forms of polystyrene.

For example, a physical characteristic which distinguishes my novel product is its rubbery, pliable and elastic character. When polymerized in the presence of acetic acid as restrainer my novel product, when stretched with the hand, may be peeled into fine elastic threads, whereas polystyrene as heretofore known has been of brittle texture.

Figure 1:
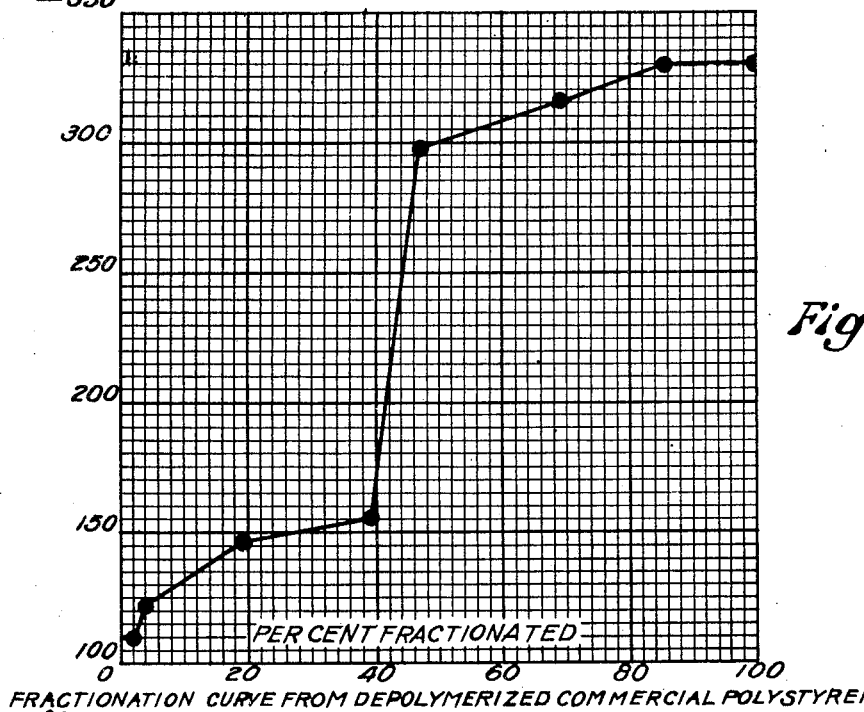
Figure 2:
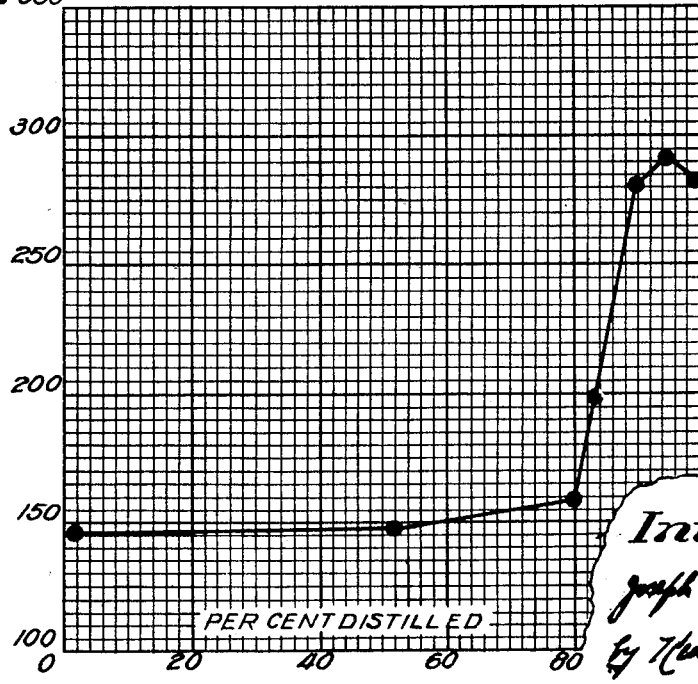

I also find that my new product, which I prefer to call sigma polystyrene, can be easily distinguished chemically from the heretofore known forms of polystyrene. Careful fractionation of the liquid obtained by thermal depolymerization of my sigma polystyrene gives about 50% of a liquid boiling at 300° to 330° C. at atmospheric pressure, while 40% boils at from 112° to 150° C. On the other hand, fractionation of the liquid obtained from the thermal depolymerization of a commercial grade of polystyrene under identical conditions gives in the neighborhood of 80% of a liquid boiling at 145° to 160° C. with the remaining 20% boiling at 160° to 300° C. This wide difference is best illustrated by Figures 1 and 2 of the accompanying drawings, which represent the fractionation curves of sigma polystyrene and of commercial polystyrene.

According to my invention, monomeric styrene may be polymerized either directly or it may first be converted into a syrupy form by gentle heating. In either case, in carrying out the process of my invention, the starting liquid is mixed with a solution consisting of concentrated sulfuric acid (for example, specific gravity 1.84) or other suitable acid catalyst and an organic liquid that I term a "restrainer." This "restrainer" restrains the tendency of the sulfuric acid to decompose or char the styrene while at the same time permitting it to exercise its effects as a polymerization catalyst. Examples of "restrainers" are acetic acid, propionic acid, the aliphatic alcohols as methanol, ethanol, normal propanol, isopropanol, normal and tertiary butyl alcohols. I prefer to use the acid catalyst and the restrainer in equal proportions by weight but the proportions are not critical, and I have successfully used one part of sulfuric acid with three parts of acetic acid, and three parts of sulphuric acid with one part of acetic acid as well as proportions intermediate between these. With higher proportions of restrainer the polymerization will still take place but proceeds more slowly.

I find that the organic liquid which is used as a restrainer in my novel polymerization process plays an important role in determining the nature of the resulting resin. If styrene is polymerized by the two-stage process, used with the acid catalyst, using an alcohol like methanol or ethanol as restrainer in polymerizing a syrup of styrene, a pliable rubber-like resin is obtained; while a tough pliable fibrous mass is obtained when acetic acid is used as restrainer. On the other hand, acetone cannot be used, as a vigorous reaction takes place in the presence of sulfuric acid, giving a black tar-like resin.

I find that the aliphatic organic acids which may be used as restrainers in my polymerization process need not be restricted to acetic acid, as for example, propionic acid acts equally as well except that the resulting resin is softer in character and probably is of a lower molecular weight; in other words, a gumlike product is obtained. Any other aliphatic organic acid having the restraining properties set forth may be considered an equivalent of the specific acids named.

I prefer to use equal parts of catalyst and restrainer in the catalyst mixture. However, I have used proportions of one part of concentrated sulfuric acid to three parts of glacial acetic acid, and three parts of sulfuric acid and one part of glacial acetic acid or methanol as restrainer. I have also used a catalyst mixture composed of one part of paratoluene sulfonic acid and 10 parts of acetic acid, using two parts of the catalyst mixture to one part of syrupy styrene.

As stated above, when an alcohol is used as restrainer, using two parts of the catalyst mixture to one part of the syrupy styrene, I have observed that, as the proportion of sulfuric acid in the catalyst mixture is increased above 1:1, the resulting product more and more resembles the type of product made using equal parts of concentrated sulfuric acid and glacial acetic acid as catalyst mixture.

I prefer to use two parts by weight of catalyst mixture to polymerize one part by weight of styrene. However, I find that it is possible to use as much as 8 parts of catalyst mixture to three parts by weight of the styrene; or as little as two parts by weight of the catalyst mixture to three parts of the styrene; or in any proportion intermediate between these.

The two-stage polymerization, that is, first polymerizing the styrene by heat to obtain a syrup and then continuing with the polymerization by using an acid catalyst, is an important discovery in controlling the nature of my new resin. As an example, if monomeric styrene is directly polymerized with an alcohol-sulfuric acid catalyst, an adhesive or a soft, gum-like product is obtained. If, however, styrene is first converted to a syrup and then polymerized, a tough, pliable, fibrous resin is obtained. Furthermore, this novel procedure provides me with a method of controlling the molecular weight of the resulting resin by varying the extent of the polymerization effected in the first stage.

I also find that my polymerization process need not be limited to sulfuric acid for preparing the catalyst mixture. A solution of phosphoric acid or an aromatic sulfonic acid, such as paratoluene sulfonic acid, in solution with one of the restrainers which I already have indicated will be effective for the polymerization.

I also find the degree of polymerization achieved by my novel process may be controlled by the duration of the polymerization and the temperature which is employed. In this way, a wide variety of products may be obtained from polymerized styrene, as for example, a soft gum, a pliable fibrous mass, or a hard rubbery resin with properties intermediate between these. In general it may be said that the polymerized styrene first separates from the reaction mixture as a white and opaque mass, and this may be converted into a clear transparent product by removal of all traces of the catalytic mixture or water that may have been used in purifying the product.

I find that the styrene resins prepared by the process of my invention can be put to a large number of commercial uses. The soft gum-like products can be used in preparing adhesives, while the harder rubbery resins can be cast into transparent pliable sheets which may be advantageously used in preparing articles for insulation or waterproofing. For example, a tough, pliable, waterproof composite material may be produced by laminating three or four layers of a heavy cotton duck with alternate layers of this rubbery sheet. A tough, semi-transparent sheet which is useful for the manufacture of raincoats and waterproof aprons resistant to acid and alkalies may be produced by pressing a rayon cloth between two layers of film prepared from my sigma polystyrene.

Further advantages of my novel invention are illustrated by the fibrous resins which I obtain by polymerizing styrene in syrupy form with approximately two parts by weight of a solution made up of equal parts by weight of concentrated sulfuric and acetic acids. The resin which is obtained in this manner, after washing free of acid, is a useful composition for insulation or waterproofing or it may be cast into rubbery sheets from a solution of the resin in organic solvents such as ethyl acetate, chloroform or the like. On extracting the resin with acetone, an acetone-insoluble portion is obtained which gives a tough, transparent sheet when cast from organic solvents, along with an acetone-soluble portion which may be recovered as an adhesive mass; or the same resin may be dissolved in a solvent such as ethyl acetate or chloroform and then be precipitated with enough "partial solvent" liquid, such as methanol or acetone, to give a different product, that is to say, a molding powder, from which non-brittle transparent objects may be prepared.

I have reason to believe that the polymer which is obtained by polymerizing styrene by my new process consists of a branched chain polymer as distinguished from the straight chain polymer heretofore known, although this suggested hypothesis need not place any limitation on my invention.

Commercial monomeric styrene from which the inhibitor has not been removed may also be polymerized by my new process, the only noticeable difference in the products being that they contain a coloration imparted by the inhibitor.

These and other advantages and characteristics of my invention will be best understood and appreciated from a consideration of the following illustrative examples of styrene polymerization resins produced in accordance with the process of my invention.

Example 1

Starting with monomeric styrene from which the inhibitor had been removed, 100 gms. was added with stirring to 200 gms. of a solution containing equal parts by weight of concentrated sulfuric and glacial acetic acids. One hour was taken to complete the addition. The temperature of the mixture rose to 110° C. and the resin separated out as a clear, transparent upper layer. The mixture was then heated with stirring for an additional two hours at 90° C. The resin was separated from the lower acid layer and freed of acid by boiling with water to give a white gum with unusual adhesive properties.

Example 2

Monomeric styrene from which the inhibitor had been removed was first polymerized to a free-flowing syrup by heating at 60° C. Five hundred grams of this syrup was then added with stirring to a solution consisting of 500 grams of concentrated sulfuric acid and 500 gms. of glacial acetic acid. One hour was taken to complete the addition. As the styrene was added it momentarily mixed with the catalyst mixture, but very quickly separated as a sticky layer floating on the liquid. The temperature of the mixture rose from 25° to 47° C. The mixture was then placed in an oven at 62° C. for twenty-four hours. At the end of this period the resin formed a rubbery mass which floats on the catalyst mixture. The acid catalyst was then decanted and the resin was washed first with water and then with a dilute solution of diethanol amine to give a hard white rubbery resin which could be cast into transparent flexible sheets from organic solvents, such as ethyl acetate, amyl acetate, or benzene.

*Example 3*

Starting with purified monomeric styrene, 50 gms. was first polymerized to a free-flowing syrup by heating at 60° C. This was then stirred into a solution consisting of 50 gms. of concentrated sulfuric acid and 50 gms. of glacial acetic acid. The temperature of the mixture rose from 50 to 70° C. and a rubbery adhesive mass was formed which floated as a separate layer on the catalyst mixture. The container was then placed in an oven at 60° C. for twenty-four hours. The acid was poured off and the resin washed free of acid, first with hot water, then with a 5% solution of diethanolamine. A white rubbery resin was obtained which could be cast into a non-tacky, pliable sheet. On dissolving this rubbery mass in ethyl acetate and then stirring the resulting solution into methanol, a white fibrous non-brittle solid was precipitated which, after washing with water and drying, had an initial softening temperature of 107° C. (as determined with a copper bar which was fitted with a thermocouple), and which could be cast into a non-brittle transparent film from organic solvents, such as ethyl acetate, benzene or chloroform, or could be molded into clear, non-brittle, transparent objects.

*Example 4*

Starting with partially polymerized styrene in the form of free-flowing syrup at room temperature, 50 gms., was stirred into a solution which consisted of 25 gms. of concentrated sulfuric acid and 75 gms. of glacial acetic acid. The styrene first appeared to dissolve but almost immediately separated out as a thick, white, adhesive mass which rose to the surface as a separate layer. The temperature of the mixture rose from 46° to 57° C. This mixture was then placed in an oven at 60° C. for twenty-four hours. The resinous mass was washed with hot water and a 5% solution of diethanol amine in water and then appeared as a hard, opaque, white, rubbery resin which did not further harden on prolonged heating at 80° C. On dissolving this in benzene and then pouring into methanol, a white fibrous solid was precipitated with an initial softening temperature above 100° C. (as determined with a copper bar fitted with a thermocouple), and which could be cast into a flexible transparent film from organic solvents such as chloroform, benzene, ethyl acetate, and amyl acetate.

*Example 5*

Monomeric styrene which was first polymerized to a free-flowing syrup, 50 gms., was stirred into a solution which was made up of 50 gms. of concentrated sulfuric acid and 50 gms. of ethyl alcohol at 80° C. There was no increase in temperature during the addition. The styrene separated out as a milky transparent upper layer. The combination of styrene, sulfuric acid and ethyl alcohol was then placed in an oven at 60° C. for twenty-four hours. At the end of this period it was washed, first with hot water and then with 5% aqueous diethanol amine solution. A semi-transparent white rubbery resin was obtained which was soluble in ethyl acetate, chloroform, and benzene. On dissolving this composition in ethyl acetate and then pouring the solution into ethyl alcohol, a white fibrous solid was obtained. After washing and drying, it was found to have an initial softening temperature of 107° C. (as determined with a copper bar), and could be molded into clear transparent non-brittle objects.

*Example 6*

One kilogram of monomeric styrene was heated at 60° C. under a reflux condenser until it was polymerized to a syrup of such a consistency that it was free flowing at room temperature. This syrup was stirred into two kilograms of a solution consisting of equal parts by weight of concentrated sulfuric acid and glacial acetic acid. The addition required thirty minutes. The temperature rose from 20 to 37° C. and a white rubbery resin separated out as the top layer. This resin was then heated in an oven at 50° C. for twelve hours. At the end of this period the resin was separated from the acid, then washed, first with hot water and then with a hot 1% solution of diethanol amine in water. A tough white mass was obtained which, on stretching, could be peeled to fine rubbery threads somewhat like a piece of hemp.

*Example 7*

To 200 gms. of a solution consisting of equal parts by weight of isopropyl alcohol in concentrated sulfuric acid, there was added 100 gms. of styrene which had been previously polymerized by heat to a free-flowing syrup. There was no noticeable temperature change during the addition but a rubbery mass separated as a top layer floating in the liquid mixture. The container was heated for twelve hours at 60° C., and then the rubbery mass was freed of acid by boiling in water and washing in a 5% solution of sodium bicarbonate to give a resin of a hard rubbery character.

*Example 8*

To a solution of 200 gms. of glacial acetic acid and 20 gms. of paratoluene sulfonic acid, there was added with stirring 100 gms. of styrene which had been first polymerized to a free-flowing syrup. There was no apparent rise in temperature during the addition but a rubbery mass separated as a distinct layer floating in the liquid mixture. The reaction mixture was heated for twelve hours at 60° C. and then freed from acid by washing first with boiling water and then with a 5% solution of sodium bicarbonate. A tough rubbery mass was obtained which was useful for the preparation of adhesives, articles of waterproofing, and insulation.

*Example 9*

Thirty grams of styrene, previously converted to a syrupy form by heat, were stirred into a solution consisting of 20 gms. of methanol and 60 gms. of concentrated sulfuric acid. The temperature of the mixture rose from 43 to 75° C. and a gummy mass separated as a distinct layer and floated in the liquid mixture. The reaction mixture was then placed in an oven at 50° C. for fifty hours. The lower acid layer was then decanted and the resin was washed first with boiling water and then with a 2% aqueous solution of diethanolamine to give a yellow colored resin which formed a soft gum in boiling water and a tough pliable rubber-like compound at room temperature.

*Example 10*

Starting with a free-flowing syrup of styrene, 30 grams, was stirred into a solution consisting of 20 grams of glacial acetic acid and 60 grams of concentrated sulfuric acid. The temperature of the mixture rose from 50 to 104° C. and the styrene separated out as a hard rubbery ball. The reaction mixture was then placed in an oven at 50° C. for fifty hours. The lower acid layer was decanted and the resin was first washed with boiling water and then with a 2% solution of diethanolamine to give an opaque white resin of a tough, pliable, fibrous character. This gave a pliable transparent film when cast from organic solvents, such as ethyl acetate, chloroform or benzene.

*Example 11*

Starting with a free-flowing syrup of styrene, 60 grams was stirred into a solution consisting of 20 grams of glacial acetic acid and 20 grams of concentrated sulfuric acid. The temperature of the mixture rose from 40 to 103° C. and a light colored rubbery mass separated as a distinct layer floating in the liquid mixture. The reaction mixture was then placed in an oven at 50° C. for fifty hours. The lower layer of the catalyst was then decanted and the resin was first washed with boiling water and then with a 2% solution of diethanolamine to give an opaque, white, elastic resin of a rubbery character.

*Example 12*

Starting with a free-flowing syrup which was prepared from purified styrene, 30 grams was stirred into a solution which consisted of 30 grams of propionic acid and 30 grams of concentrated sulfuric acid. The temperature of the polymerization mixture rose from 53 to 95° C. and a light colored gummy mass separated as a distinct layer floating in the liquid mixture. The reaction mixture was then placed in an oven at 50° C. for fifty hours. On washing free of acid, first with boiling water and then with a 2% solution of diethanolamine, a soft white gum was obtained.

*Example 13*

Purified styrene was first polymerized to a free-flowing syrup at room temperature; 40 grams of this syrup was stirred into a solution consisting of 40 grams of glacial acetic acid and 20 grams of phosphoric acid. There was no marked temperature rise resulting from the addition but a gummy mass separated and floated as a layer in the liquid mixture. The mixture was then placed in an oven at 50° C. for fifty hours. The acid catalyst forming the lower layer was then decanted and the resin was first washed with boiling water and then with a hot 1% solution of diethanolamine to give a white, soft, adhesive gum which was useful for the preparation of adhesives or as a plasticizer for other resins.

*Example 14*

To 200 grams of catalyst mixture which consisted of equal parts by weight of concentrated sulfuric acid and tertiary butyl alcohol, 100 grams of a syrup of styrene was added in one hour with stirring. At the end of this period, the styrene had separated out as a separate top layer. There was no noticeable temperature rise during the addition. The container with the polymerization mixture was then placed in an oven at 60° C. for twelve hours. The acid catalyst was decanted and the resin was washed with boiling water with kneading, then with a 1% solution of sodium bicarbonate and finally again with boiling water. An opaque white rubber-like resin was obtained as the polymerization product.

*Example 15*

50 grams of crude commercial monomeric styrene which contained the usual inhibitor, was stirred into 100 grams of a solution consisting of equal parts by weight of concentrated sulfuric acid and glacial acetic acids. Fifteen minutes were taken to add the styrene. The temperature of the mixture rose from 60° C. to 100° C. during the addition. The resin separated out as an upper layer of a white opaque gum. The mixture was stirred with a mechanical stirrer for one hour, then heated in a water bath at 60° C. for six hours. The acid catalyst was decanted and the resin was washed with hot water with kneading. A white adhesive rubbery product was obtained as the product.

Having thus disclosed my invention and described in detail several illustrative examples of the manner in which it has been actually practised, I claim as new and desire to secure by Letters Patent:

1. The process of producing polymeric styrene in the form of a solid light-colored rubbery resin, which consists in first heating and thereby partially polymerizing monomeric styrene to convert it to a free-flowing syrup, and then further polymerizing the styrene while heated between 37°–110° C. for a period of 3–24 hours in the presence of an acid from the group consisting of sulfuric acid, phosphoric acid, and the aromatic sulphonic acids, and a restrainer from the group consisting of acetic acid, propionic acid, and the saturated monohydroxy aliphatic alcohols with not more than 5 carbon atoms, the restrainer being present in the proportion 1 part to from $\frac{1}{3}$ to 1 part acid catalyst, and the styrene being present in the proportion 1 part to from 2 to $2\frac{2}{3}$ parts catalyst mixture.

2. The process of producing polymeric styrene in the form of a solid light-colored rubbery resin, which consists in polymerizing monomeric styrene while heated between 37°–110° C. for a period of 3–24 hours in the presence of an acid from the group consisting of sulfuric acid, phosphoric acid, and the aromatic sulphonic acids, and a restrainer from the group consisting of acetic acid, propionic acid, and the saturated monohydroxy aliphatic alcohols with not more than 5 carbon atoms, the restrainer being present in the proportion 1 part to from $\frac{1}{3}$ to 1 part acid catalyst, and the styrene being present in the proportion 1 part to from 2 to $2\frac{2}{3}$ parts catalyst mixture.

3. The process of producing polymeric styrene in the form of a solid light-colored rubbery resin from commercial monomeric styrene containing an inhibitor, which consists in polymerizing the said styrene while heated between 37°–110° C. for a period of 3–24 hours in the presence of concentrated sulfuric acid and glacial acetic acid, the glacial acetic acid being present in the proportion 1 part to from $\frac{1}{3}$ to 1 part sulfuric acid, and the styrene being present in the proportion 1 part to from 2 to 2⅔ parts catalyst mixture.

4. A new form of polymeric styrene produced by the method of claim 3 and comprising a rubbery light-colored solid capable of thermal depolymerization into liquid of which approximately 50% boils at 300°–350° C. and approximately 40% boils at 112°–150° C.

JOSEPH D. SURMATIS.

REFERENCES CITED

The following references are of record in the file of this patent:

FOREIGN PATENTS

| Number | Country | Date |
|---|---|---|
| 504,571 | Great Britain | Apr. 27, 1939 |

OTHER REFERENCES

Staudinger: Trans. Faraday Soc., 32, pages 101–105 (1936).

Koenigs et al.: Berichte 25, pp. 2653, 2658 (1892).

Institution of The Rubber Industry, vol. 6, page 51.

Ellis: Chemistry of Synthetic Resins, vol. 1, pp. 234–240 (1935).